(12) United States Patent
Reddy

(10) Patent No.: US 12,458,798 B2
(45) Date of Patent: Nov. 4, 2025

(54) IMPLANTING A LEAD IN THE INTERNAL THORACIC VASCULATURE

(71) Applicant: CARDIAC PACEMAKERS, INC., St. Paul, MN (US)

(72) Inventor: G. Shantanu Reddy, Minneapolis, MN (US)

(73) Assignee: CARDIAC PACEMAKERS, INC., St. Paul, MN (US)

( * ) Notice: Subject to any disclaimer, the term of this patent is extended or adjusted under 35 U.S.C. 154(b) by 1349 days.

(21) Appl. No.: 17/023,947

(22) Filed: Sep. 17, 2020

(65) Prior Publication Data

US 2021/0077810 A1 Mar. 18, 2021

Related U.S. Application Data

(60) Provisional application No. 62/902,179, filed on Sep. 18, 2019.

(51) Int. Cl.
*A61N 1/05* (2006.01)

(52) U.S. Cl.
CPC .......... *A61N 1/0592* (2013.01); *A61N 1/057* (2013.01); *A61N 2001/0578* (2013.01)

(58) Field of Classification Search
CPC .... A61N 1/0592; A61N 1/057; A61N 1/0504; A61N 2001/0578
See application file for complete search history.

(56) References Cited

U.S. PATENT DOCUMENTS

| | | | |
|---|---|---|---|
| 5,331,966 A | 7/1994 | Bennett et al. | |
| 6,219,582 B1 | 4/2001 | Hofstad et al. | |
| 6,647,292 B1 | 11/2003 | Bardy et al. | |
| 6,721,597 B1 | 4/2004 | Bardy et al. | |
| 7,149,575 B2 | 12/2006 | Ostroff et al. | |
| 7,655,014 B2 | 2/2010 | Ko et al. | |
| 7,783,340 B2 | 8/2010 | Sanghera et al. | |
| 7,818,068 B2 | 10/2010 | Meadows et al. | |
| 7,962,222 B2 | 6/2011 | He et al. | |
| 8,005,543 B2 | 8/2011 | Libbus et al. | |
| 8,157,813 B2 | 4/2012 | Ko et al. | |
| 8,386,048 B2 | 2/2013 | McClure et al. | |

(Continued)

FOREIGN PATENT DOCUMENTS

| | | |
|---|---|---|
| WO | 2016148928 A1 | 9/2016 |
| WO | 2016149262 A1 | 9/2016 |

OTHER PUBLICATIONS

Cleveland Clinic, "Internal Thoracic Vein," <URL: https://my.clevelandclinic.org/health/body/23066-internal-thoracic-vein (Year: 2024).*

(Continued)

*Primary Examiner* — David Hamaoui
*Assistant Examiner* — Adreanne A. Arnold
(74) *Attorney, Agent, or Firm* — Seager, Tufte & Wickhem LLP

(57) ABSTRACT

Methods for implanting leads in the internal thoracic vein (ITV) of a patient may include first screening the patient to determine if various screening criteria are met. The screening criteria may include rib spacing, ITV location, and ITV diameter. When a predetermined parameter of at least one of the screening criteria is met, the implantation of one or more leads extending into the ITV and to a pulse generator are completed.

17 Claims, 13 Drawing Sheets

(56) References Cited

U.S. PATENT DOCUMENTS

| | | |
|---|---|---|
| 8,483,843 B2 | 7/2013 | Sanghera et al. |
| 8,543,216 B2 | 9/2013 | Carbunaru et al. |
| 2005/0043765 A1 | 2/2005 | Williams et al. |
| 2007/0213813 A1 | 9/2007 | Von Segesser et al. |
| 2008/0071339 A1 | 3/2008 | Stalker et al. |
| 2010/0191043 A1 | 7/2010 | Chin |
| 2012/0029335 A1 | 2/2012 | Sudam et al. |
| 2014/0107719 A1 | 4/2014 | Bornzin et al. |
| 2014/0114371 A1 | 4/2014 | Westlund et al. |
| 2014/0330326 A1 | 11/2014 | Thompson-Nauman et al. |
| 2015/0025612 A1 | 1/2015 | Haasl et al. |
| 2015/0051610 A1 | 2/2015 | Schmidt et al. |
| 2015/0196756 A1 | 7/2015 | Stahmann et al. |
| 2015/0196757 A1 | 7/2015 | Stahmann et al. |
| 2015/0196758 A1 | 7/2015 | Stahmann et al. |
| 2015/0196769 A1 | 7/2015 | Stahmann et al. |
| 2015/0224320 A1 | 8/2015 | Stahmann |
| 2015/0297902 A1 | 10/2015 | Stahmann et al. |
| 2015/0352358 A1 | 12/2015 | Atwater |
| 2015/0360036 A1 | 12/2015 | Kane et al. |
| 2016/0038742 A1 | 2/2016 | Stahmann et al. |
| 2016/0059007 A1 | 3/2016 | Koop |
| 2016/0059022 A1 | 3/2016 | Stahmann et al. |
| 2016/0059024 A1 | 3/2016 | Stahmann et al. |
| 2016/0059025 A1 | 3/2016 | Stahmann et al. |
| 2016/0089539 A1 | 3/2016 | Gilkerson et al. |
| 2016/0228712 A1 | 8/2016 | Koop |
| 2016/0256692 A1 | 9/2016 | Baru |
| 2017/0021159 A1 | 1/2017 | Reddy et al. |
| 2017/0112399 A1 | 4/2017 | Brisben et al. |
| 2017/0113040 A1 | 4/2017 | Brisben et al. |
| 2017/0113050 A1 | 4/2017 | Brisben et al. |
| 2017/0113053 A1 | 4/2017 | Brisben et al. |
| 2018/0036527 A1 | 2/2018 | Reddy et al. |
| 2018/0036547 A1 | 2/2018 | Reddy |
| 2018/0133462 A1 | 5/2018 | Reddy et al. |
| 2018/0133463 A1 | 5/2018 | Reddy |
| 2018/0133494 A1 | 5/2018 | Reddy |
| 2018/0178019 A1 | 6/2018 | Reddy et al. |
| 2018/0193060 A1* | 7/2018 | Reddy .................. A61N 1/0504 |

OTHER PUBLICATIONS

International Search Report and Written Opinion dated Sep. 29, 2017 for International Application No. PCT/US2017/045109.

Moeinipour et al., "A Rare Central Venous Catheter Malposition: A Case Report," Anesth Pain Med., 4(1): 1-3, Feb. 5, 2014.

Schuder et al., "Experimental Ventricular Defibrillation with an Automatic and Completely Implanted System," Trans. Amer. Soc. Artif. Int. Organs, XVI: 207-212, 1970.

Schuder et al., "The Role of an Engineering Oriented Medical Research Group in Developing Improved Methods and Devices for Achieving Ventricular Defibrillation: The University of Missouri Experience," PACE, 16: 95-124, Jan. 1993.

Ghosh et al., "A Rare Malposition of the Thoracic Venous Catheter Introduced via the Left Internal Jugular Vein," Indian J. Crit. Care Med., 12(4): 201-203, Oct.-Dec. 2008.

Loukas et al., "The Clinical Anatomy of the Internal Thoracic Veins," Folia Morphol, 66(1): 25-32, 2007.

\* cited by examiner

IMPLANTING A LEAD IN THE INTERNAL THORACIC VASCULATURE

CROSS-REFERENCE TO RELATED PATENT DOCUMENTS

This application claims the benefit of and priority to U.S. Provisional Patent Application 62/902,179, filed on Sep. 18, 2019 and titled IMPLANTING A LEAD IN THE INTERNAL THORACIC VASCULATURE, this disclosure of which is incorporated by reference.

BACKGROUND

The implantable defibrillator has been demonstrated to extend patient lives by treatment of potentially deadly arrhythmias. Over time, various efforts have been made to address complications associated with implantation of such devices. For example, early devices generally used epicardial patch electrodes implanted via thoracotomy, with attendant surgical risks and significant risks of failure of the epicardial patch electrodes and associated leads. The use of transvenous leads represented a major advance, avoiding the thoracotomy and improving reliability. However, lead failure remained a significant issue, as the lead attachment in the heart requires the lead to flex with each heartbeat. The advent of subcutaneous defibrillators allows avoidance of these lead failure issues, with leads implanted beneath the skin and over the ribcage of the patient and not subjected to the repeated flexing caused by cardiac motion.

However, subcutaneous defibrillators require higher energy for defibrillation, causing the pulse generators for such systems to be larger than their transvenous predecessors, and both bradycardia pacing and anti-tachycardia pacing are of limited utility as such pacing subcutaneously can be very uncomfortable for the patient. This has led to interest in further alternative locations for implantable defibrillators and their associated leads, and other medical devices such as the implantable pacemaker.

SUMMARY

The present inventors have recognized, among other things, that a problem to be solved is the need for additional alternatives to existing implant techniques and locations for therapy and sensing apparatuses in the thorax of a patient. The internal thoracic vein (ITV) may offer new and useful alternative locations as described further below. The ITV may be accessed by several avenues explained and discussed below.

In an example, a method of implanting a lead for a cardiac rhythm management device in a patient comprises screening the patient for at least one screening criteria including rib spacing, internal thoracic vein (ITV) location, and ITV diameter at one or more of the right or left second or third intercostal spaces, determining the patient meets a predetermined parameter for at least one of the screening criteria, marking at least one of rib margin or sternum margin on skin of the patient at the right or left second or third intercostal spaces to identify an ITV access location, making at least one incision at the ITV access location and dissecting to the ITV, inserting a micropuncture wire into the ITV, swapping the micropuncture wire for a guidewire having a diameter greater than a diameter of the micropuncture wire, and inserting a sheath into the ITV, forming a tunnel by subcutaneously or submuscularly tunneling between a pulse generator pocket location and the ITV access location, passing a first end of a lead into the tunnel and a second end of the lead into the sheath, removing the sheath to leave at least the second end of the lead in the ITV, and securing the first end of the lead to a pulse generator disposed within the pulse generator pocket.

Alternatively or additionally to any of the above examples, at least one of the rib spacing, ITV location, and ITV diameter is determined using an ultrasound transducer.

Alternatively or additionally to any of the above examples, the ITV access location is the right or left second intercostal space.

Alternatively or additionally to any of the above examples, the ITV access location is the right or left third intercostal space.

Alternatively or additionally to any of the above examples, the ITV access location is the right second or third intercostal space.

Alternatively or additionally to any of the above examples, the ITV access location is the left second or third intercostal space.

Alternatively or additionally to any of the above examples, the predetermined parameter for ITV location is 1 cm to 2 cm from the left or right sternal margin.

Alternatively or additionally to any of the above examples, the predetermined parameter for rib spacing is at least 2 cm.

Alternatively or additionally to any of the above examples, the predetermined parameter for ITV diameter is at least 2 mm.

Alternatively or additionally to any of the above examples, the tunnel is formed by tunneling from the pulse generator pocket location to the ITV access location.

Alternatively or additionally to any of the above examples, the tunnel is formed by tunneling from the ITV access location to the pulse generator pocket location.

In another example, a method of screening a patient for cardiac rhythm management lead implantation into the patient's internal thoracic vein (ITV) comprises determining rib spacing at a predetermined position, the predetermined position being one of the right or left second or third intercostal spaces, determining ITV location relative to the predetermined position, determining ITV diameter at the predetermined position, and determining the patient meets criteria for ITV lead implantation when at least one of the rib spacing, ITV location, and ITV diameter meets a predetermined parameter.

Alternatively or additionally to any of the above examples, at least one of the rib spacing, ITV location, and ITV diameter is determined using an ultrasound transducer, x-ray, or fluoroscopy.

Alternatively or additionally to any of the above examples, the predetermined position is the right or left second intercostal space.

Alternatively or additionally to any of the above examples, the predetermined position is the right or left third intercostal space.

Alternatively or additionally to any of the above examples, the predetermined parameter for ITV location is at least 1 cm from the left or right sternal margin.

Alternatively or additionally to any of the above examples, the predetermined parameter for rib spacing is at least 2 cm.

Alternatively or additionally to any of the above examples, the predetermined parameter for ITV diameter is at least 2 mm.

In another example, a method of implanting a lead in a patient for a cardiac rhythm management device comprises making an axillary incision near the patient's left axilla and creating a pulse generator pocket, making an ITV incision at either a second or third intercostal space, up to 3 cm left or right of a left or right sternal margin and cutting down to and accessing a selected one of the patient's left or right ITV, making a xiphoid incision near the patient's xiphoid on either the left or right side of the patient's midline, making a first tunnel from the axillary incision to the xiphoid incision, making a second tunnel from the xiphoid incision to the ITV incision, emplacing a lead having a proximal end for attachment to a pulse generator and a distal end carrying a plurality of electrodes thereon with the proximal end at the pulse generator pocket, a first proximal portion extending in the first tunnel, a distal portion in the ITV, and a second proximal portion distal of the first proximal portion extending in the second tunnel, and securing one or more suture sleeves to the patient's fascia in at least one of the ITV incision, xiphoid incision, or axillary incision.

This summary is intended to provide an introduction to the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
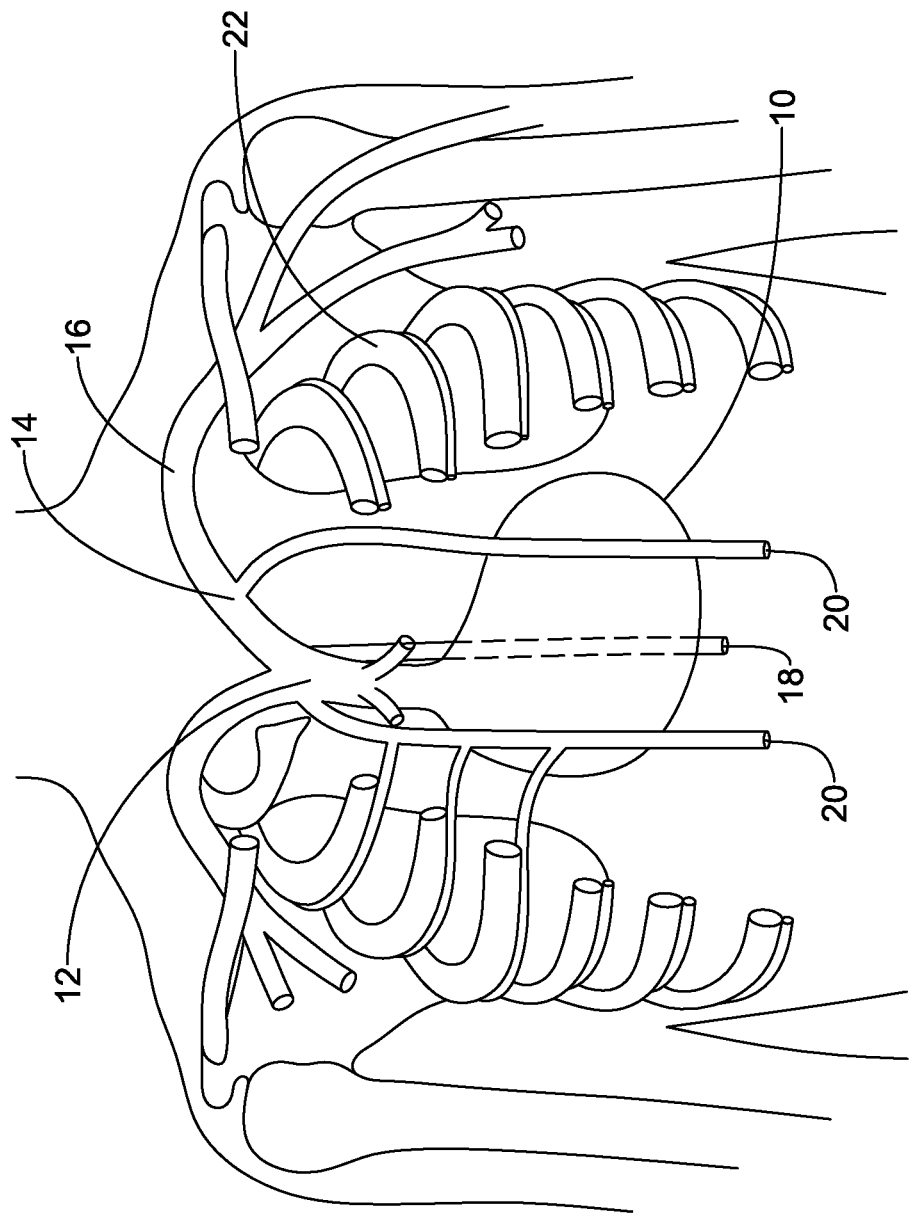
FIG. 1 illustrates the thoracic anatomy including placement of the internal thoracic veins (ITVs)

The S-ICD System from Boston Scientific provides benefits to the patient including the preservation of transvenous anatomy and avoidance of intracardiac leads, which may fracture and/or may serve as conduits for infection to reach the heart, and can occlude blood vessels going into the heart, making later placement of leads or other devices in the heart more difficult. Some examples and discussion of subcutaneous lead implantation may be found in U.S. Pat. No. 8,157,813, titled APPARATUS AND METHOD FOR SUBCUTANEOUS ELECTRODE INSERTION, and US PG Publication No. 20120029335, titled SUBCUTANEOUS LEADS AND METHODS OF IMPLANT AND EXPLANT, the disclosures of which are incorporated herein by reference. Additional subcutaneous placements are discussed in U.S. Pat. No. 6,721,597, titled SUBCUTANEOUS ONLY IMPLANTABLE CARDIOVERTER DEFIBRILLATOR AND OPTIONAL PACER, and U.S. Pat. No. 7,149,575, titled SUBCUTANEOUS CARDIAC STIMULATOR DEVICE HAVING AN ANTERIORLY POSITIONED ELECTRODE the disclosures of which are incorporated herein by reference.

While many patients can be well treated with the S-ICD System, there continue to be limitations. Increased energy requirements of the S-ICD System, perceived difficulty with providing chronic bradycardia pacing, and unavailability of anti-tachycardia pacing to terminate select fast tachycardia, have created interest in alternative defibrillator and/or pacemaker placement techniques. One proposal has included a substernal placement, with a lead extending beneath the sternum from a position inferior to the lower rib margin, such as in U.S. Patent Application Pub. No. 2017/0021159, titled SUBSTERNAL PLACEMENT OF A PACING OR DEFIBRILLATING ELECTRODE, the disclosure of which is incorporated herein by reference. Proposals for a substernal device have been referred to as extravascular, insofar as the lead does not enter or reside in the vasculature. Such devices are distinct from early generation epicardial devices in that the lead and electrode would not touch the heart or enter or be secured to the pericardium.

A further alternative placement involves inserting a lead into the internal thoracic vein (ITV), also referred to as the internal mammary vein, such as in U.S. Patent Application Pub. No. 2018/0036527, titled IMPLANTATION OF AN ACTIVE MEDICAL DEVICE USING THE INTERNAL THORACIC VASCULATURE, the disclosure of which is incorporated herein by reference. Another method of implanting a lead in the ITV is described in U.S. Patent Publication Pub. No. 2018/0133494, titled PARASTERNAL PLACEMENT OF AN ACTIVE MEDICAL DEVICE USING THE INTERNAL THORACIC VASCULATURE, the disclosure of which is incorporated herein by reference.

The internal thoracic vein (ITV) is a vessel that drains the chest wall and breasts. There are both left and right internal thoracic veins on either side of the sternum, beneath the ribs. The ITV arises from the superior epigastric vein, accompanies the internal thoracic artery along its course and terminates in the brachiocephalic vein. The inventor has recognized that the ITV may make a suitable location for placement of a cardiac stimulus lead, and the ITV may be accessed parasternally, for example through one of the intercostal spaces. Placement of an electrode system in the ITV may enable defibrillation thresholds lower than the conventional S-ICD system allowing for a smaller pulse generator device and increased safety margin. Given the proximity of the ITV to the heart, pacing may be viable as well. The parasternal method of accessing the ITV may allow for more predictable access than a superior or inferior approach, given the increase in diameter of the vein as it rises superiorly in the thorax. Further, the ITVs are consistently located in most people, generally 1-2 cm from the sternum. While variability may still occur, the parasternal approach may allow for blind or guided intercostal access to the ITV.

Figure 4:
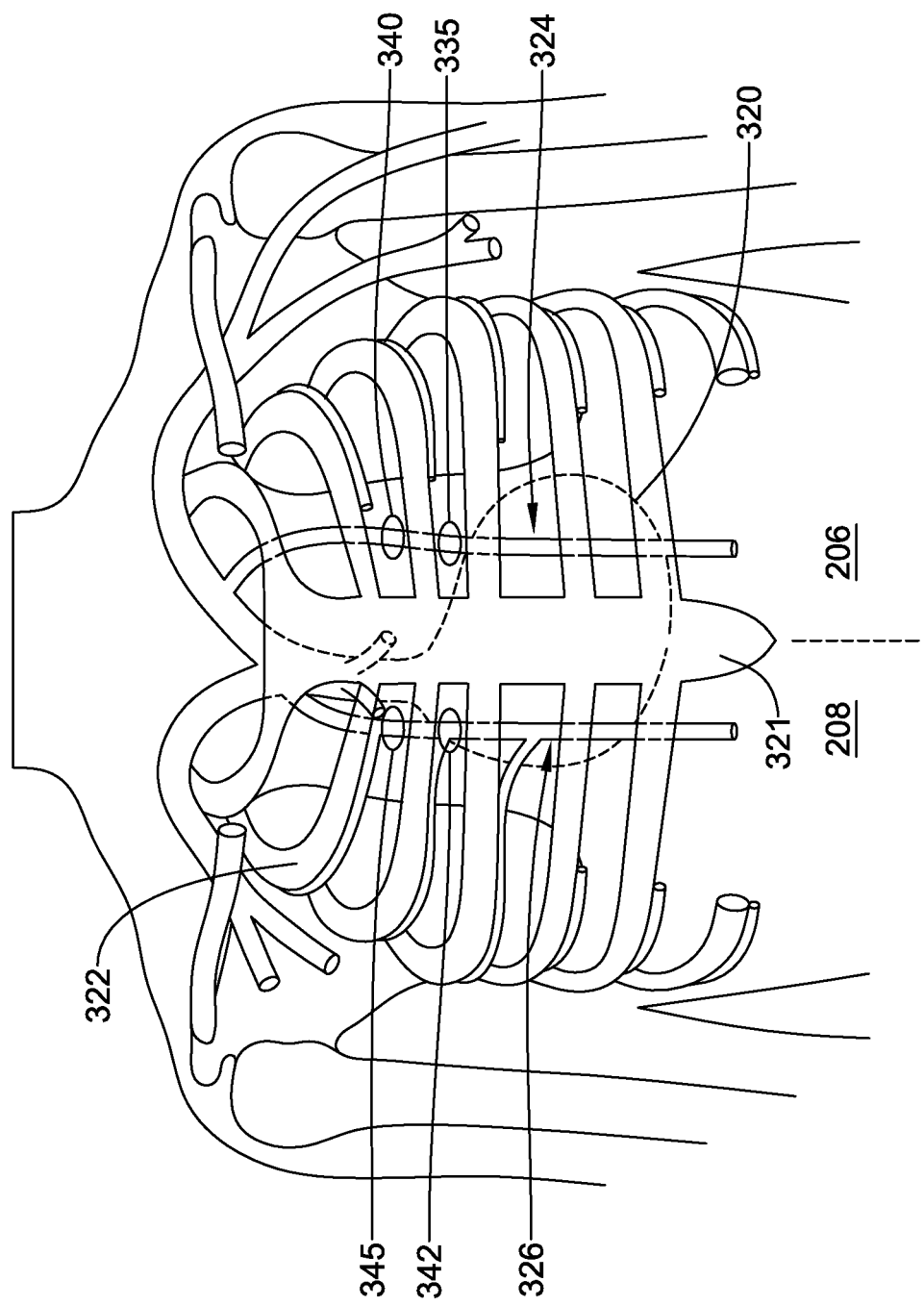
FIG. 4 illustrates intercostal access locations usable for access to the ITVs.

FIG. 1 illustrates portions of the thoracic anatomy including location of the internal thoracic veins (ITVs). The ribcage is shown at 22 and an outline of the heart is shown at 10, with the superior vena cava (SVC) shown at 12. The brachiocephalic veins 14 couple to the SVC and extend past various cephalic branches to the subclavian vein 16. The azygos vein is shown at 18 and the right and left ITVs are shown at 20. The sternum is not shown to allow visualization of the heart in relation to the ITVs. FIG. 4 shows the position of the ITVs in relation to the sternum.

Figure 2:
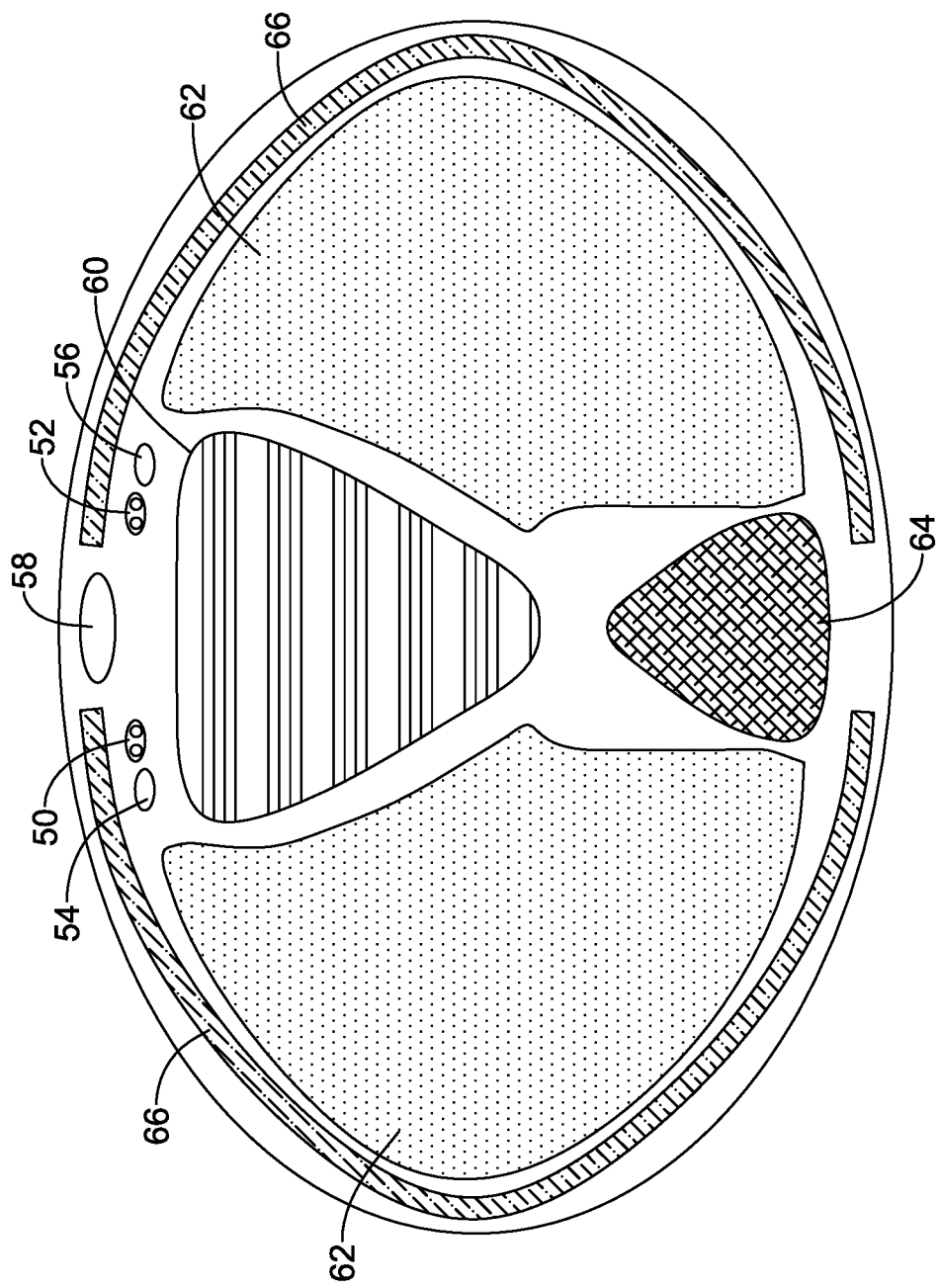
FIG. 2 shows the torso in a section view to highlight the location of the ITVs and arteries.

FIG. 2 shows the torso in a section view to highlight the location of the ITVs and internal thoracic arteries. More particularly, in the example, the right and left ITV are shown at 50, 52, running parallel to and more central of the internal thoracic arteries 54, 56, on either side of the sternum 58. The heart is shown at 60, with the lungs at 62 and spinal column at 64. The ITVs 50, 52 lie beneath the ribs 66 but outside and separate from the pleurae of lungs 62. As used herein, the "ITV" is the name applied for the vein while it runs beneath the chest, that is, superior to the lower margin of the ribs. Inferior to the lower margin of the ribs, the blood vessel continues as the superior epigastric vein. The relatively superficial position makes the ITVs 50, 52 accessible from an access point between the ribs 66, which may be referred to as the intercostal space, as further discussed below. In the discussion below, the term parasternal is used as it more specifically describes accessing the ITV at a location adjacent the sternum, and includes accessing the ITV at any location along the length of the ITV, adjacent the sternum.

Figure 3B:
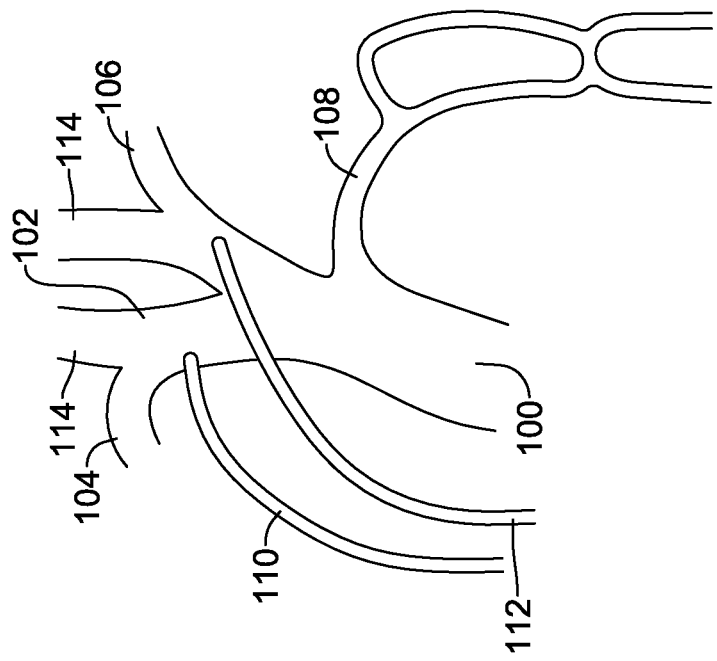
FIGS. 3A and 3B show the ITVs and linked vasculature in isolation.
Figure 3A:
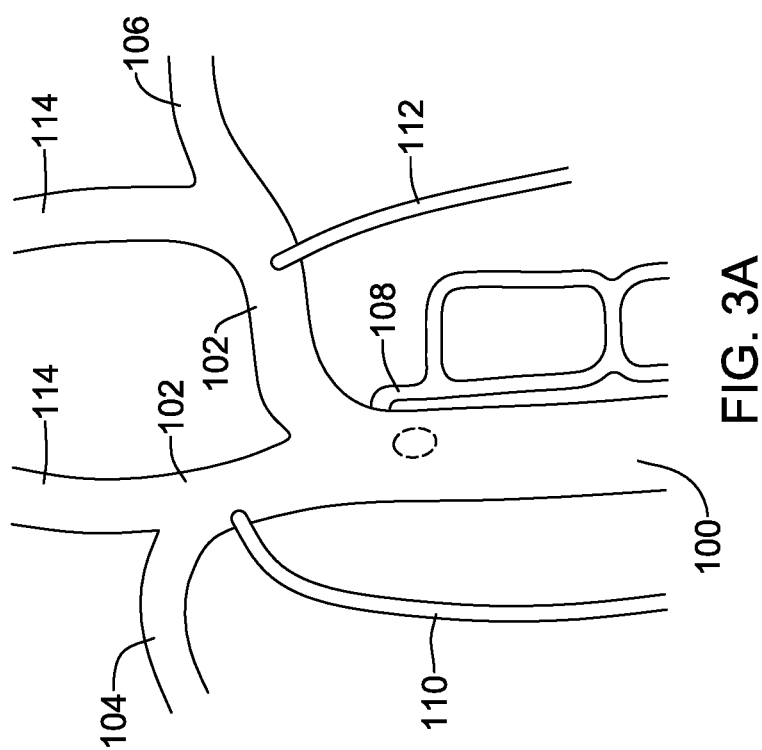

FIGS. 3A-3B show the ITV and linked vasculature in isolation. FIG. 3A is an anterior view of selected portions of the venous structure of the upper torso, and FIG. 3B is a lateral view of the same. The SVC is shown at 100, with the brachiocephalic veins 102 splitting at the upper end of the SVC. The right subclavian vein is at 104, and the left subclavian vein is at 106. The azygos vein is include in the illustration at 108, extending off the posterior of the SVC, and runs inferiorly posterior of the heart as can be understood from the lateral view of FIG. 3B. The right and left ITV are shown at 110, 112, respectively. These each branch off at a location that is considered part of the brachiocephalic veins 102. The internal jugular veins are also shown at 114.

FIG. 4 shows various intercostal access points for implantation of a lead in the ITV. The heart is shown at 320 beneath the ribcage 322 and sternum 321, with the right ITV at 326 on the right side of the body 208 and the left ITV at 324 on the left side of the body 206. Intercostal access to the ITVs may be achieved at any location, however, more superior positions may be desired to allow passage of the distal end of a lead along a significant region of the ventricles and atria by passing in a particular direction. Superior positions include access locations 340 and 345 in the second intercostal space between ribs 2 and 3, and access locations 335 and 342 in the third intercostal space between ribs 3 and 4. Access locations into the left ITV 324 are shown at the second intercostal space 340 and the third intercostal space 335, and access locations into the right ITV 326 are shown at the second intercostal space 345 and the third intercostal space 342.

The present inventors have determined that access to the ITV can be achieved through the intercostal space with little difficulty to facilitate lead placement by accessing the ITV between various ribs, provided the patient meets certain screening criteria. In order to determine whether or not a patient is a candidate for intercostal ITV lead placement, the particular body characteristics of a given patient may be screened. Body characteristics may include, for example, rib spacing at the desired ITV access location, ITV location relative to the sternum, and ITV size including any venous abnormality. Additionally, any scarring in the area (such as related to any prior sternotomy or the like) may be evaluated. The body habitus (overweight or underweight patients) may also be a screening factor, however, the sternum is generally readily accessible even in overweight patients as relatively little tissue (including muscle and fat) is disposed over the sternum regardless of body composition.

The screening may be performed using an ultrasound transducer, particularly to determine rib spacing, ITV location, and ITV diameter. The location of the internal thoracic artery may also be determined via ultrasound, in order to make sure the vein and not the artery is accessed. In other examples, X-ray or fluoroscopy may be used for the screening. The screening may generally be performed prior to the surgical procedure, with the patient awake, such as may happen several days before the implantation surgery. If desired, any of ultrasound, X-ray, and fluoroscopy devices may be present in the operating room and available for use in repeating the screening method, if desired, immediately before the implantation procedure. Ultrasound, X-ray, or fluoroscopy may also be used to mark the location of the rib margins and sternal margins during the procedure, as discussed below. In some examples, MRI may also be used, although this generally requires moving the patient to and from the MRI suite.

In general, the screening procedure may be used to evaluate the suitability of the patient's anatomy at an access location, which may be the second or third intercostal space on either the left or right side of the sternum. The screening method generally involves measuring various parameters at one or more of several potential access locations. In an example, four access locations are checked (second intercostal space on right, second intercostal space on left, third intercostal space on right, third intercostal space on left). In some examples, the parameters are measured first at the second intercostal space on the left side, then the right side, and if those locations do not satisfy the desired parameters, then measurements may be taken at the third intercostal space on the left and then the right side. Other orders of criteria measurement may be used. Fewer positions may be monitored if desired; for example, only one position, or two, or three, may be checked. In other examples, more or different positions may be checked.

A first screening criteria may include spacing between ribs at the access location. The spacing between ribs must be sufficient to perform the cut-down and insertion of the lead. In some examples, a predetermined parameter for spacing between ribs is at least 1.8 cm. In other examples, the desired spacing is at least 2 cm. In further examples, the desired spacing is at least 2.5 cm. A second screening criteria may include the ITV location relative to the sternum. In some examples, a predetermined parameter for the ITV location is between 0.5 cm and 5 cm from the sternal margin, and more particularly between 1 cm and 3 cm from the sternal margin.

In one example, the predetermined parameter for ITV location is at least 1 cm from the sternal margin. A third screening criteria may be the diameter of the ITV. In some examples, a predetermined parameter for the ITV diameter is at least 1.8 mm for purposes of screening. Alternatively, the predetermined parameter for the ITV diameter may be at least 2 mm, at least 2.5 mm, at least 3.0 mm, or at least 3.5 mm.

When measuring the rib spacing, ITV location and ITV diameter, any deformities or anatomical irregularities of the heart, ribs and ITV may also be determined. For example, irregularities in the heart positioning such as transposition, missing or inaccessible veins due to a by-pass, sternotomy, or other irregularities in the position or structure of the heart, ribs, or ITV, may render the patient unsuitable for intercostal ITV lead placement absent physician judgment to the contrary. Enlargement of the heart, such as from hypertrophic cardiomyopathy, however, may not disqualify the patient as this may cause the heart to be pushed against the ITV, resulting in adequate or even improved (reduced threshold) pacing. Thus while some anomalies or conditions may suggest avoiding the use of the ITV, others conditions such as hypertrophy may encourage use of the ITV. With a patient having hypertrophic cardiomyopathy, an additional screening criteria may comprise measuring cardiac signal amplitude, such as the R-wave, cutaneously or from within the ITV, to ensure that the signal is not too large in amplitude for system circuitry to properly handle as, for example, may be an issue if the input ECG amplification circuitry has an upper signal amplitude limit. In other examples, patient screening may comprises cardiac signal analysis performed using, for example, the methods, apparatuses and/or systems of U.S. Pat. No. 8,079,959.

If the patient meets the predetermined parameter for at least one of the screening criteria for at least one of the possible intercostal access locations 335, 340, 342, 345, the patient may be deemed suitable for the implantation of a lead in the ITV via an intercostal access point. Depending on which screening criteria are met, the method of implanting the lead may be modified. For example, if the ITV diameter is less than the predetermined parameter of 1.8 mm or 2 mm, the lead may need to be inserted directly into the ITV, without the use of a sheath. If the rib spacing is less than the desired 2 cm, the Seldinger technique may be used to advance the lead instead of a cut-down technique.

In an example, when the measurements have been made for all four possible access locations, the location that meets the most predetermined parameters for screening criteria may be selected. If some of the access locations do not meet the predetermined parameter for at least one screening criteria, such location(s) may be removed from the list of suitable access locations. If all possible access locations 335, 340, 342, 345 meet the predetermined parameters for all of the screening criteria, then any of the access locations may be used. As long as at least one of the possible access locations 335, 340, 342, 345 meets the predetermined parameter of at least one screening criteria, the implantation of a lead into that access location may proceed. If none of the possible access locations meets the predetermined parameter for at least one screening criteria, then a traditional transvenous ICD implantation procedure with leads inserted directly into the heart, or an S-ICD implantation procedure with leads inserted subcutaneously may be used.

The ITV for which the predetermined parameters of at least one screening criteria is satisfied may be accessed. A venous cut-down technique may be used to access the desired ITV 326, 324 by incision through the skin. For example, ultrasound may be used to determine the location of the ITVs, and marks may be made on the patient's skin to show the rib margins and the edge of the sternum at the selected intercostal space. The initial cut-down incision may be made horizontally over the intercostal space and centered over the ITV, followed by tissue dissection to the vein. Next, possibly after visual confirmation the desired vessel is accessed, a micropuncture wire may be inserted into the vein, and then swapped for a guidewire larger than the micropuncture wire. The guidewire may be a 0.035 inch guidewire, though other sizes may be used. The guidewire may be advanced to the desired location of the distal tip of the lead. A sheath may then be inserted over the guidewire and the guidewire removed. In some examples, the sheath may be 8 French in diameter, though 4, 5, 6, 7, 9 or 10 French sheaths may be used instead, or other sizes. A tunnel may then be formed between an implanted pulse generator and the intercostal incision, starting from either the pulse generator or the intercostal incision. The tunnel may be subcutaneous or submuscular. Once access to a selected ITV 326, 324 is achieved, the vessel can be traversed in an inferior direction to place the lead at a desired position relative to the heart by entering the corresponding ITV.

In some examples, a flexible lead may be introduced with the support of a guide catheter during advancement. The guide catheter may receive the lead through a guide catheter lumen that serves to retain a fixation apparatus or shape for the flexible lead, such as a 2-dimensional or 3-dimensional curvature, tines, an expandable member, or hooks or a side-extending engagement structure. Additionally or alternatively, a stylet may be placed through the lead, or a portion thereof, to retain a straight shape during implantation; upon removal of the stylet, a curvature may then be released for securing the lead in place. Some illustrative lead fixation structures are described in U.S. Patent Publication Pub. No. 2018/0133494, titled PARASTERNAL PLACEMENT OF AN ACTIVE MEDICAL DEVICE USING THE INTERNAL THORACIC VASCULATURE, the disclosure of which is incorporated herein by reference.

The proximal end of the lead may be passed through the tunnel and connected to the pulse generator, and the distal end of the lead may be inserted through the sheath and advanced to the desired location relative to the heart, followed by removal of the sheath and closing the incision.

Alternatively, after the selected ITV is accessed via cut-down, an incision may be made into the vein followed by direct insertion of the lead into the ITV. The limited angulation involved with inserting the lead into the ITV from an intercostal access point may allow the lead to be inserted directly into the ITV, without the use of a guidewire or sheath. This may provide a faster and simpler lead placement method. The guide catheter and guidewire may be omitted by providing a lead with a flexible or steerable structure, and/or a lead configured for implantation using a steerable stylet. The lead may be provided with an atraumatic distal tip, using, for example, a softer material at the distal tip than elsewhere on the lead. In an example, a lead having one or more ring or coil electrodes may use the electrode positions to transition from a harder material suitable for subcutaneous placement—used proximal to the electrode—to a softer material suitable for advancing in the ITV distal to the electrode. A multi-layer construction may be useful for this purpose, with an inner layer of the lead containing one or more conductors and outer layers of first and second different materials.

In some examples, a lead may be configured to be implanted using a steerable stylet by including a lumen therein.

Once initial access is achieved, simply pushing the stylet should be sufficient to implant the lead to a desired level in the ITV. The stylet may have a secondary function of preventing an anchoring structure of the lead from assuming an anchoring shape or releasing an anchoring tine, hook, expandable member, stent or other device.

In other examples, access to the ITV may be achieved using ultrasound guided needle insertion. The access method may resemble the Seldinger technique, though in this case the muscle adjacent the sternum in the intercostal space would first be traversed. The Seldinger technique may include creating a puncture at one of the access locations 335, 340, 342, or 345, with a hollow needle or trocar, for example under ultrasound guidance, introducing a guidewire through the needle and into the desired ITV, removing the needle, keeping the guidewire in place, and then inserting an introducer sheath, which may have a valve at its proximal end, over the guidewire. The lead may then be introduced through the introducer sheath, on its own, over the guidewire, or with a stylet inserted therein. Alternatively, other venipuncture or cutdown techniques, with or without guidewires and sheaths may be used for placement of the lead into the ITV.

FIGS. 5-11 illustrate various parasternal implantation methods using different intercostal locations to access the ITVs. In the figures, portions of the ribs and sternum are not shown to better illustrate the position of the ITVs and electrodes disposed therein. In the following methods, the pulse generator 550 may be implanted first, with an axillary incision made near the patient's left axilla, followed by creating a pocket and inserting the pulse generator 550. In other examples, the pulse generator 550 may be implanted after the electrode structure 554 is implanted.

Figure 5:
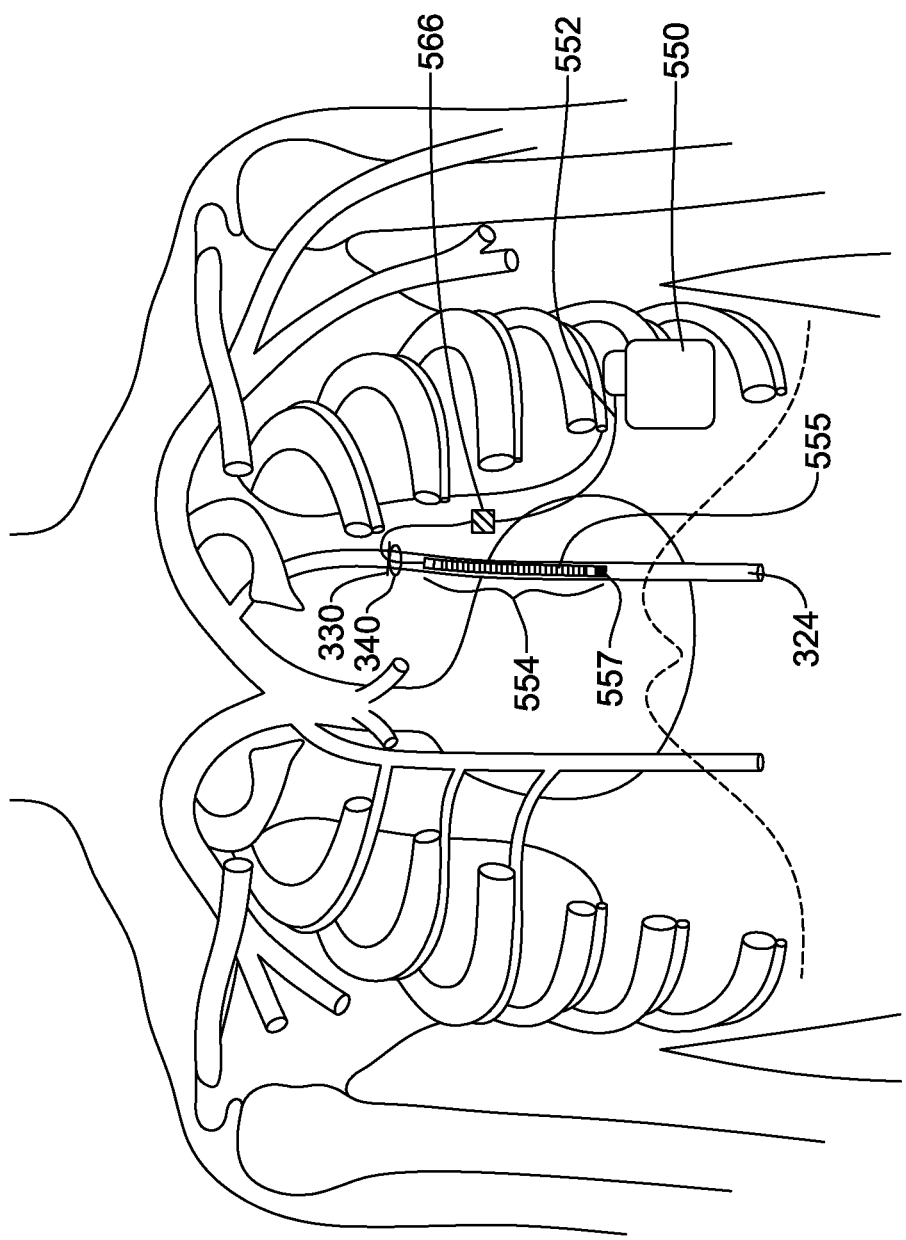
FIG. 5 illustrates access through the second intercostal space and parasternal implantation in the left ITV.

FIG. 5 shows parasternal implantation using superior access at the second intercostal access location 340 into the left ITV 324. The cut-down technique may be used, with a first incision 330 made horizontally in the second intercostal location 340 over the left ITV 324. In some examples, the ITV incision may be made up to 3 cm to the left of the sternal margin. After tissue dissection and accessing the vein, the electrode structure 554 of the lead 552 may be inserted into the ITV extending in an inferior direction. As shown, the electrode structure 554 includes a coil electrode 555 and a ring electrode 557, however it will be understood that other combinations of electrodes may be used. This method involves implantation of an implantable pulse generator 550 and lead 552.

The lead 552 may be tunneled between the second intercostal access location 340 and the pulse generator 550, which may be implanted at the left axilla as illustrated. The tunnel may be made starting from the second intercostal access location 340 and extending straight across the ribcage to the pulse generator 550, or the tunnel may be made in the opposite direction, starting from the pulse generator 550 and extending straight across to the second intercostal access location 340. Alternatively, additional incisions may be made allowing for tunneling from the intercostal access point to a xiphoid or parasternal incision where a turn may be made to tunnel straight to the pulse generator at the left axilla, as discussed below with regard to FIGS. 9-10. The tunnel may be subcutaneous or submuscular.

In an example, subcutaneous implantation of the lead 552 may be performed using a proximal end pulling technique, wherein the lead 552 is implanted by pulling the proximal end thereof from the incision 330 at the intercostal access location 340 to the axillary pocket for the pulse generator 550, thus protecting the distal portion of the lead from the forces associated with implantation and from environmental exposure to microbes. In an example, the ITV implantation may occur last, after the subcutaneous portion is placed, with a suture sleeve 566 applied to secure the lead to the fascia after the ITV placement is completed. The suture sleeve 566 may include a portion adapted to place adjacent the ITV access to partly close the access location. The suture sleeve 566 may include a coating thereon for anti-microbial purposes to prevent or slow the advancement of any subcutaneous infection into the vein, should such an infection occur.

The pulse generator 550 may instead be implanted in a generally subclavicular or pectoral location, if desired, as described below with regard to FIG. 11. The electrode structure 554, as with all other implanted leads shown herein, may include a fixation structure such as bends or curves along its distal length, or tines, hooks or expandable members at its distal end to secure its position within the left ITV 324.

Figure 6:
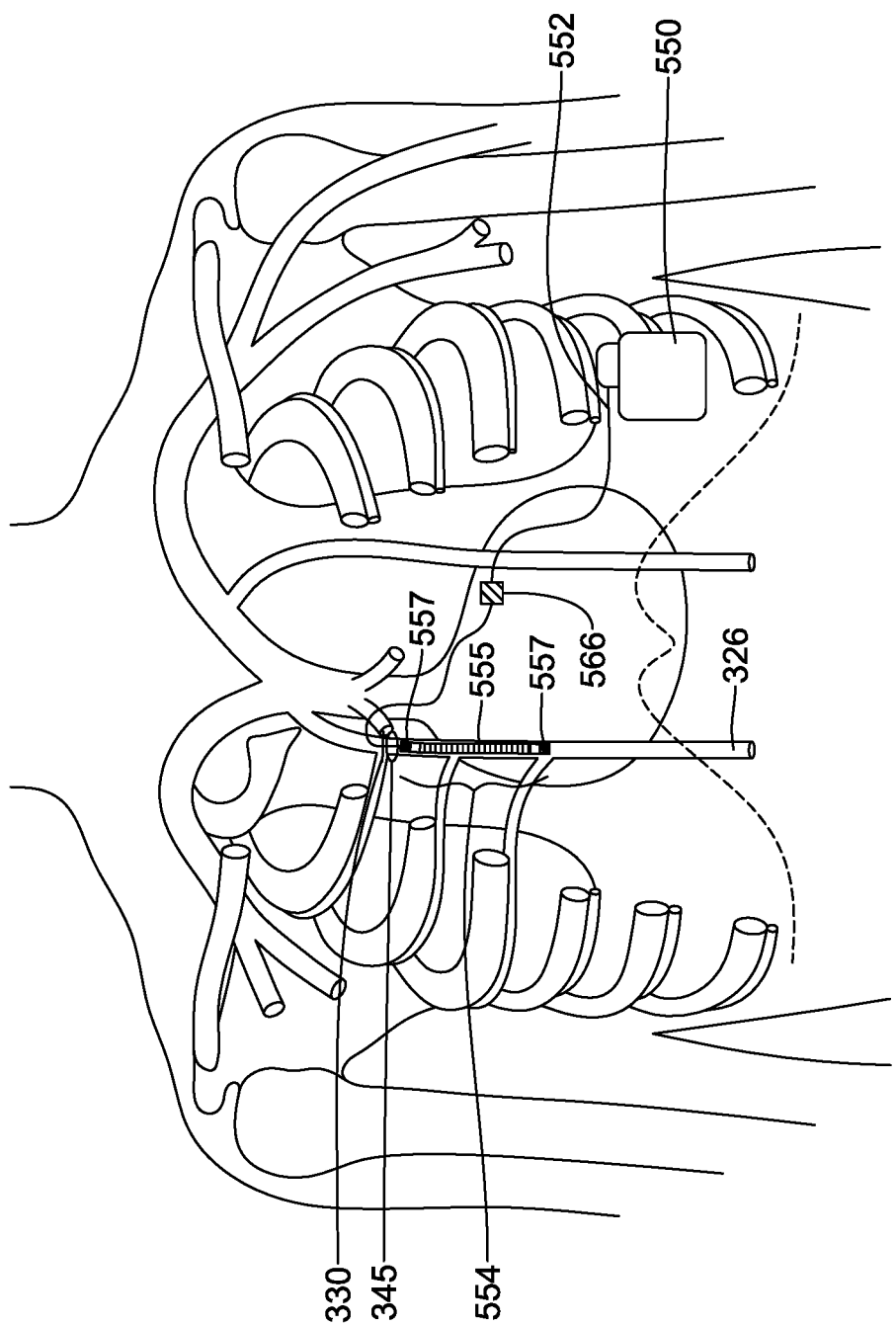
FIG. 6 illustrates access through the second intercostal space and parasternal implantation in the right ITV.

FIG. 6 shows parasternal implantation through incision 330 at the second intercostal location 345 into the right ITV 326 with implantation of an electrode structure 554 extending in an inferior direction. In this example, after the electrode structure 554 is inserted into the right ITV 326, a lead 552 is tunneled between the second intercostal location 345 and the pulse generator 550 located at the left axilla. The tunnel may be created starting from the second intercostal location 345 and moving over the sternum and ribcage straight to the pulse generator 550, or the tunnel may be created starting from the pulse generator 550 and moving toward the second intercostal location 345. As shown, the electrode structure 554 includes a coil electrode 555 flanked with two sensing electrodes 557, however it will be understood that other combinations of electrodes may be used.

Figure 7:
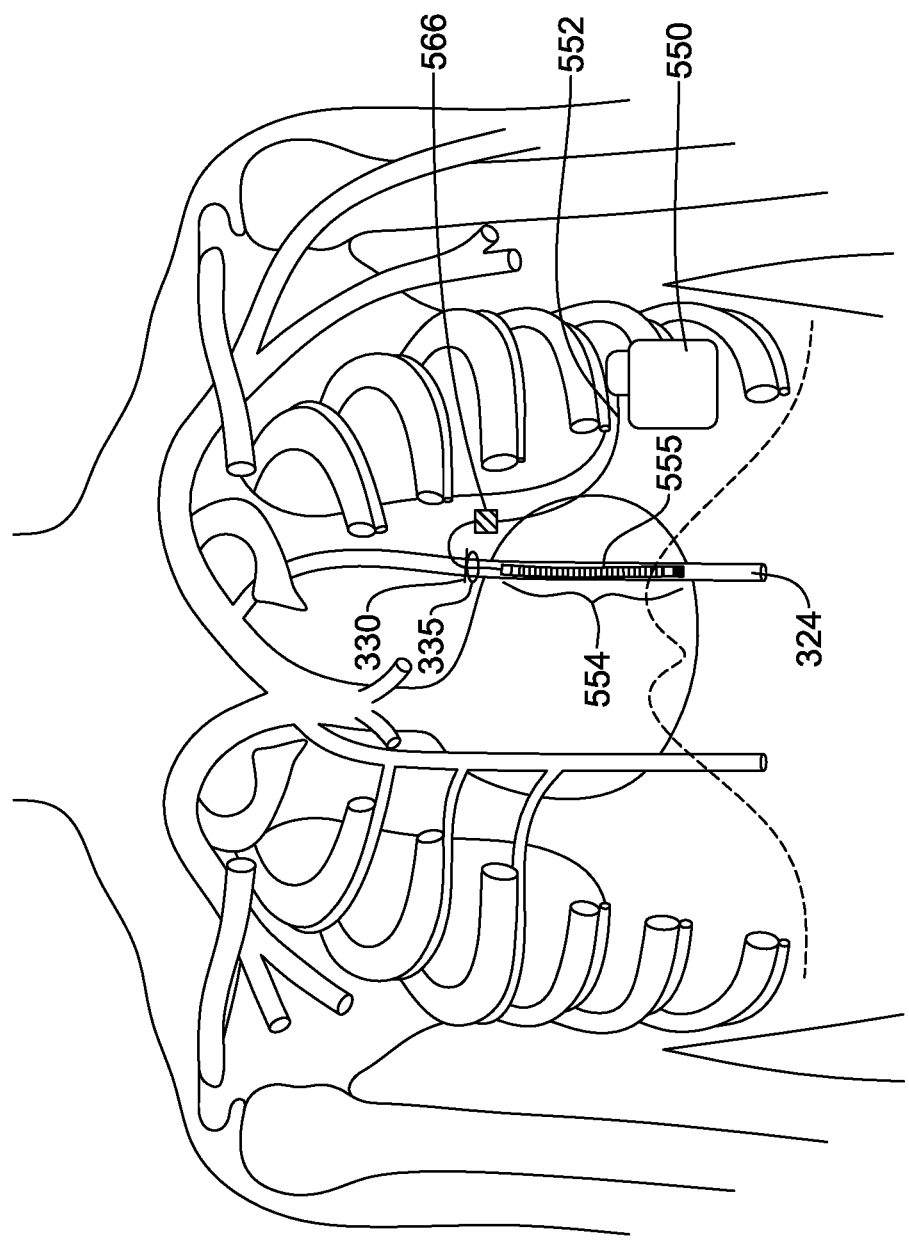
FIG. 7 illustrates access through the third intercostal space and parasternal implantation in the left ITV.
Figure 8:
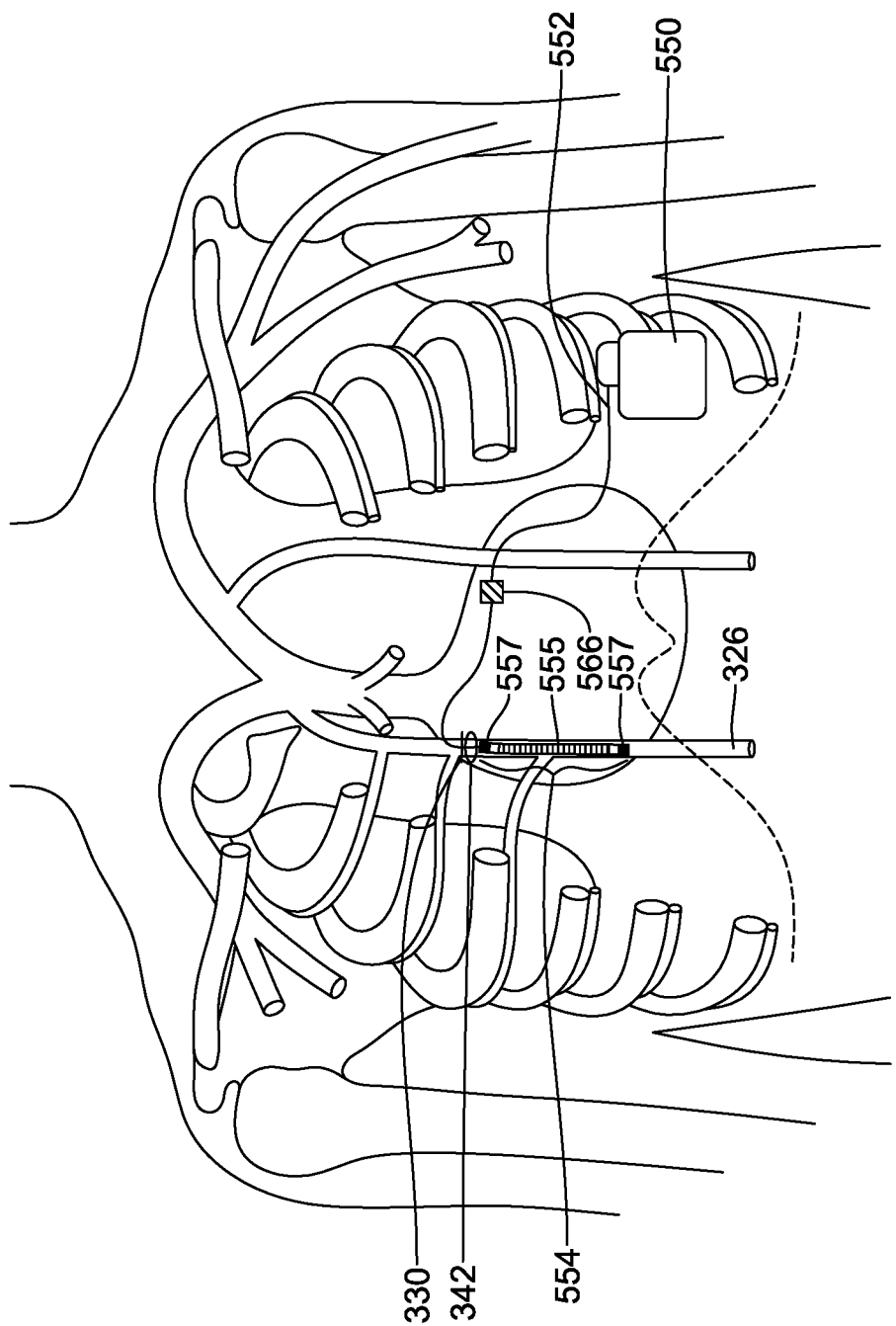
FIG. 8 illustrates access through the third intercostal space and parasternal implantation in the right ITV.

FIG. 7 shows parasternal implantation of the electrode structure 554 using the third intercostal location 335 into the left ITV 324, and FIG. 8 shows parasternal implantation of the electrode structure 554 using the third intercostal location 342 into the right ITV 326. In both methods, the steps are the same as discussed above with the exception of the location of the intercostal incision 330.

Figure 9:
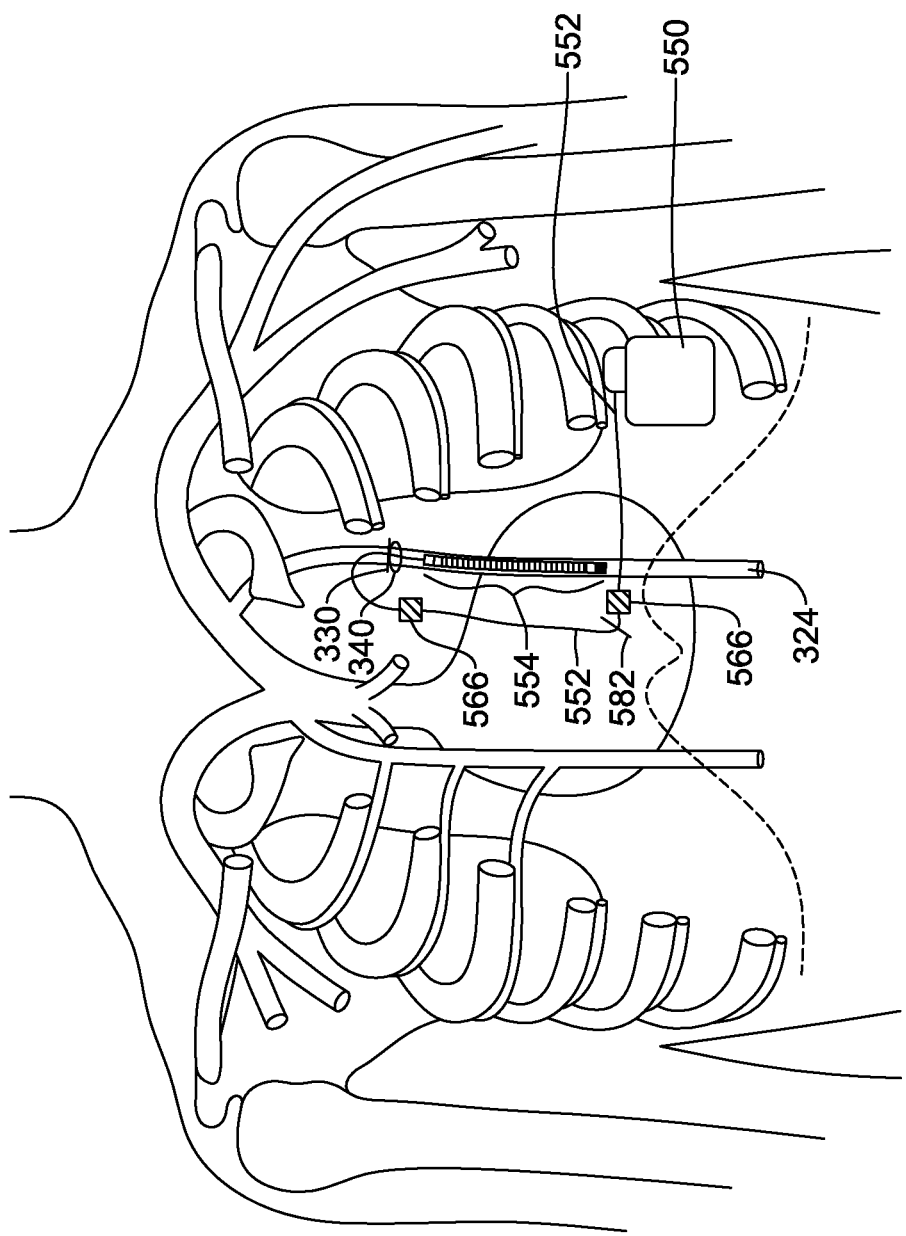
FIG. 9 illustrates access through the second intercostal space and parasternal implantation in the left ITV with a lead extending medially and then superiorly to the left of the sternum.

In another example, a traditional S-ICD System implant pathway may be used. In this method, additional incisions may be made allowing for tunneling from the intercostal access point to a xiphoid or parasternal incision where a turn may be made to tunnel straight to the pulse generator at the left axilla. This eliminates tunneling across the main part of the pectoralis muscle but does require additional incisions and anchoring points. As shown in FIG. 9, an implantable pulse generator 550 is shown generally at the left axilla, with a lead 552 extending medially therefrom toward the xiphoid. Similar to the method illustrated in FIG. 5, a first incision 330 is made over the ITV at the second intercostal space 340 and the electrode structure 554 is inserted into the ITV inferiorly. However, instead of the lead 552 extending straight between the pulse generator 550 and the first incision 330, a xiphoid incision 582 is made and the lead 552 is tunneled first from the pulse generator 550 to the xiphoid incision 582 and then from the xiphoid incision 582, the lead 552 extends superiorly along and just left of the sternum (not shown) to the first incision 330. Near the first incision 330, the lead 552 is shown extending through the ITV second intercostal access location 340 into the left ITV 324. From access point 340, the lead extends inferiorly within the ITV.

Figure 10:
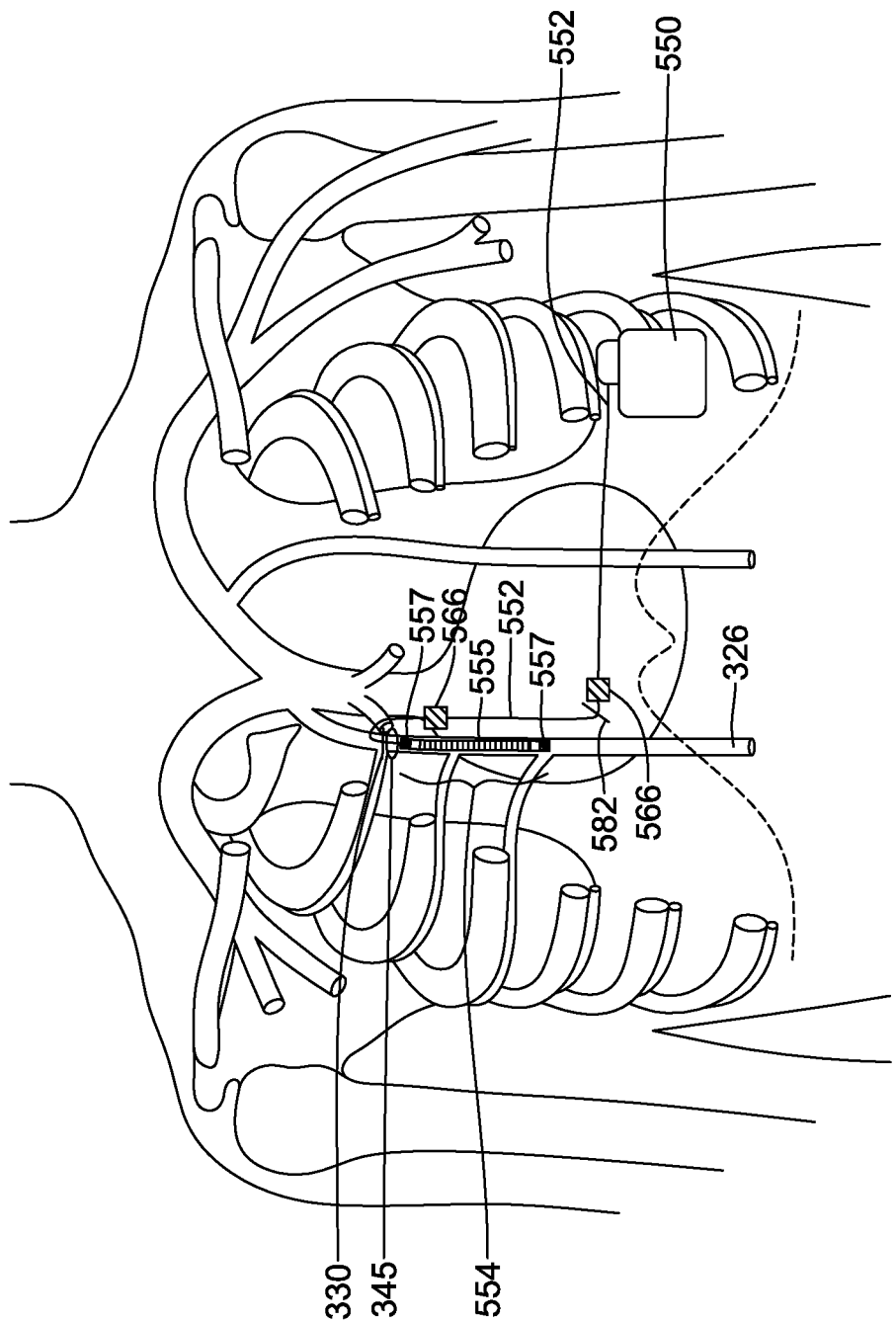
FIG. 10 illustrates access through the second intercostal space and parasternal implantation in the right ITV with a lead extending medially and then superiorly to the right of the sternum.

One or more suture sleeves 566 may be used adjacent the incisions 330, 582 to secure the lead 552 to the fascia. This lead placement may also be applied to the method illustrated in FIG. 7, utilizing the third intercostal space 335 for accessing the left ITV 324. Similarly, in methods involving accessing the right ITV 326, the lead 552 may be extended medially from the pulse generator 550 to a xiphoid incision 582 and then superiorly along and just right of the sternum (not shown) to the first incision 330 over the right ITV in the second intercostal space 345, as shown in FIG. 10. This lead placement may also be applied to the method illustrated in FIG. 8, utilizing the third intercostal space 342 for accessing the right ITV 326.

Figure 11:
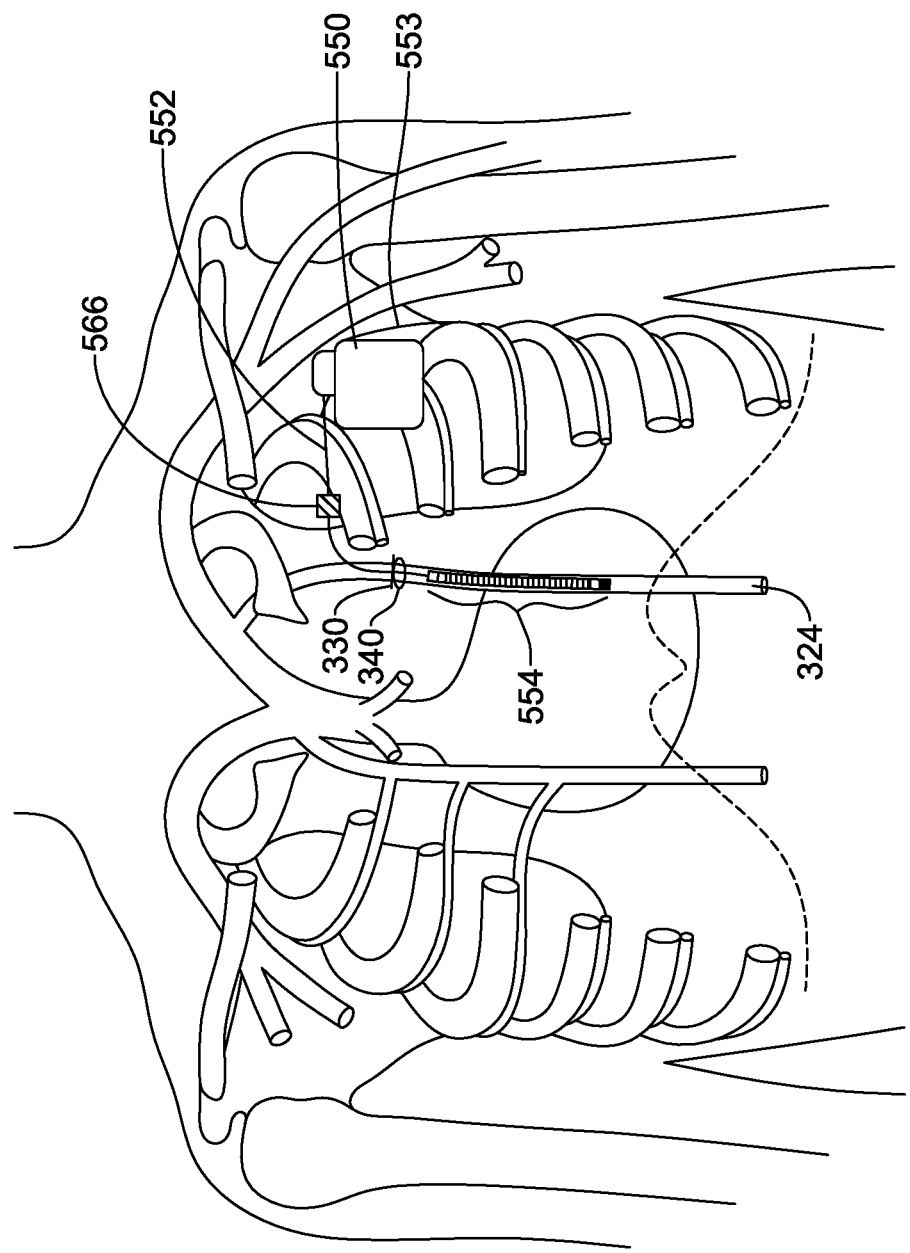
FIG. 11 illustrates access through the second intercostal space and parasternal implantation in the left ITV and connection to a pulse generator in a subclavicular position.

In another example, the pulse generator 550 may be placed in a subclavian position, as shown in FIG. 11. Alternatively, the pulse generator may be placed at the left pectoral muscle. With such a placement, any of the four intercostal locations 335, 340, 342, 345 may be used to insert the lead into the left or right ITV as desired. As with the left axilla position of the pulse generator 550 discussed above and illustrated in FIG. 5, a first incision 330 may be made horizontally in the second intercostal location 340 over the left ITV 324. After tissue dissection and accessing the vein, an electrode structure 554 may be inserted into the ITV extending in an inferior direction. The lead 552 extends from the second intercostal access location 340 directly to the pulse generator 550, which may be implanted subclavicularly as illustrated. A suture sleeve 566 may be used to secure the lead 552 to the fascia. Additionally, if a posterior coil (not shown) is desired, a lead 553 extending from the pulse generator 550 around to the patient's back may be used.

Figure 12:
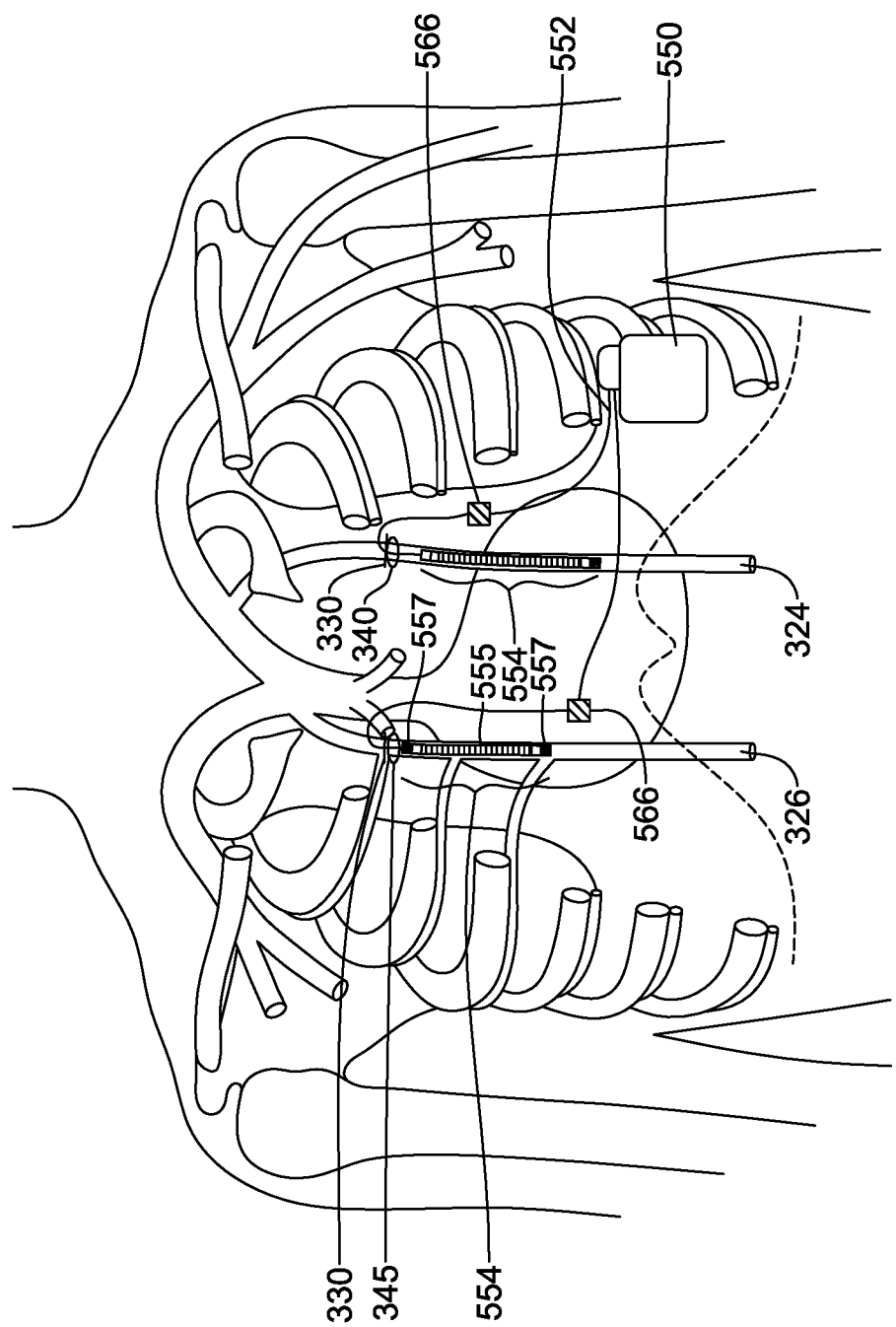
FIG. 12 illustrates access through the second intercostal spaces and parasternal implantation in both the left and right ITV.

In some examples, each of the left and right ITV 324, 326 may receive an electrode structure 554 with leads 552 extending to a single pulse generator 550, as shown in FIG. 12. FIG. 12 shows the leads 552 with electrode structures 554 being inserted through incisions 330 in the second intercostal space 340, 345 of the left 324 and right 326 ITV, respectively. It will be understood that electrode structures 554 may be implanted into both of the left and right ITVs 324, 326 through the third intercostal spaces 335, 342, as shown in FIGS. 7-8. Alternatively, a first electrode structure 554 and lead 552 may be implanted through the second intercostal space 340, 345 of one of the left and right ITV 324, 326, and a second electrode structure 554 and lead 552 may be implanted through the third intercostal space 335, 342 into the other ITV. Additionally, the leads 552 may be implanted via a combination of intercostal and xiphoid incisions, as shown in FIGS. 9-10. Further, electrode structures 554 may be implanted into both the left and right ITVs 324, 326 when the pulse generator 550 is implanted in a subclavian position, as shown in FIG. 11, or in a pectoral position, or any other desired position.

The two leads 552 extending from the two electrode structures 554 in each ITV may be split into first and second portions, and a yoke may be provided near the pulse generator 550 to join the two leads together, or a header on the pulse generator may be configured to receive more than one lead, if desired, to provide leads in each of the left and right ITV 324, 326. If two leads are provided, one lead may be in the right ITV with another lead in the left ITV. For example, pacing between right and left side lead placements may be performed to target specific chambers or chamber combinations, or sensing may be performed using one pair of electrodes with therapy delivery using a different pair of electrodes to achieve resynchronization or other desirable effect.

The various electrodes 555, 557 on the lead 552 may be used for sensing cardiac signals in various combinations. Electrode sense vector selection may be performed, for example, by methods and circuitry discussed in U.S. Pat. No. 7,783,340, titled SYSTEMS AND METHODS FOR SENSING VECTOR SELECTION IN AN IMPLANTABLE MEDICAL DEVICE USING A POLYNOMIAL APPROACH, and U.S. Pat. No. 8,483,843, SENSING VECTOR SELECTION IN A CARDIAC STIMULUS DEVICE WITH POSTURAL ASSESSMENT, and/or US PG Patent Pub. Nos. 2017/0112399, 2017/0113040, 2017/0113050, and 2017/0113053, the disclosures of which are incorporated herein by reference.

Additionally, defibrillation therapy may use a combination of electrode coils coupled in common as the opposing pole to the pulse generator, while pacing therapy may use coils as opposing electrodes for post-shock pacing therapy, with a still different combination of electrodes may be used to provide ventricular pacing therapy for example by pacing between a coil and a tip electrode.

This description of electrode utility is not intended to be limiting; other combinations and uses may apply for the coil and other electrodes; the coil(s) may be used for sensing, and the ring or tip electrodes may be used for therapy delivery. If desired, one or more sensing and/or therapy electrodes may take the form of a directional electrode that does not traverse fully around the circumference of the lead. The number of electrodes may be increased as desired, for example, 2 or 3 electrodes are shown; 6, 8, 16, or more electrodes may be used if desired. For example, an 8 or 16 electrode lead (similar to those used in Neuromodulation systems, such as the Boston Scientific Corporation Infinion™ 16 Percutaneous Lead, featuring 16 electrode contacts, over a 67 mm Span; for cardiac purposes such a lead may be modified, for example, by using a wider inter-electrode spacing and/or different electrode surface area) may be used, with individual electrodes selected for sensing and/or pacing, while sets of electrodes may be ganged together for defibrillation therapy delivery.

In another example, a sensing electrode for p-wave sensing may be implanted in the right ITV and a pacing/defibrillation therapy electrode may be implanted in the left ITV. The implanted device may communicate the p-wave information to a leadless device(s) for the purposes of ventricular pacing with atrial tracking (VDD). When electrodes are placed in both the left and right ITV, any combination and orientation of sensing, pacing, and defibrillation electrodes may be used, depending on the desired sensing and pacing. For example, placement of electrodes in the right ITV may be desired for multiple pacing electrodes in a superior location to cover the right atrium.

Further, placing one or more pacing electrodes in an inferior location may be desired to cover the right ventricle for therapy (or sensing) purposes. Alternatively, a defibrillation coil electrode may be used in this location. In some examples, electrodes positioned to sense the p-wave may be desired to time pacing of the right ventricle either from the ITV or from another lead or leadless device placed in the right ventricle or elsewhere in or near the heart. The above examples apply equally to the left ITV, with multiple electrodes positioned in superior positions for left atrial sensing and/or pacing. Multiple electrodes placed in inferior positions may be used for left ventricular sensing and/or pacing, and a coil defibrillation electrode may be desired in these locations for defibrillation.

In any of the above examples, additional lead placement may take place. For example, an additional lead may be placed subcutaneously, within the heart, or in a different blood vessel such as the azygos vein. Additional device placement may occur as well, including, for example, the placement of a leadless cardiac pacemaker in one or more chambers of the heart.

The above examples facilitate a number of therapy options. For example, defibrillation therapy may be delivered in various configurations such as, without limitation:
- Between a left ITV electrode or combination of electrodes and a right ITV electrode or combination of electrodes;
- Between a left ITV electrode and a device housing placed in the left axilla or left subclavicular location;
- Between a right ITV electrode and a device housing placed in the left axilla or left subclavicular location;
- Between a left ITV electrode and a device housing placed in the right axilla or right subclavicular location;
- Between left and right ITV electrodes electrically in common and a right or left axillary or subclavicular canister;
- Between one ITV electrode and a second ITV electrode in common with a device canister in the left or right axilla or sublcavicular location;
- Between a first electrode on a lead, and a second electrode on the same lead, where the first and second electrodes are in the same ITV;
- Between a first electrode on a first finger of a bifurcated lead, and a second electrode on a second finger, where the first and second fingers are connected to the same bifurcated lead, where the first and second electrodes are in an ITV.

In these examples, a "left ITV electrode" or "right ITV electrode" may include a single coil electrode or a combination of plural coils and/or one or more coils with one or more ring electrodes electrically in common. The above combinations may also be used for delivery of a bradycardia pacing therapy or an anti-tachyarrhythmia pacing therapy.

Further examples may provide a resynchronization therapy by delivering pacing pulses in various configurations, such as, without limitation:
- In bipolar fashion within the left ITV to pace the left ventricle, and also in bipolar fashion within the right ITV to pace the right ventricle, with relative timing between the two sets of pacing therapies determined according to analysis of cardiac output or electrical response.
- In bipolar fashion within one of the left or right ITV to stimulate a respective left or right ventricle in response to sensed signals in the left atrium (LA) and right atrium (RA) sensed with electrodes placed in an ITV at a superior location level with the atria.
- In monopolar fashion between a device housing and one or both of left or right ITV electrodes, using for timing information atrial signals sensed using additional electrodes in at least one ITV and/or far-field sensed morphology detected using a device housing.

Figure 13:
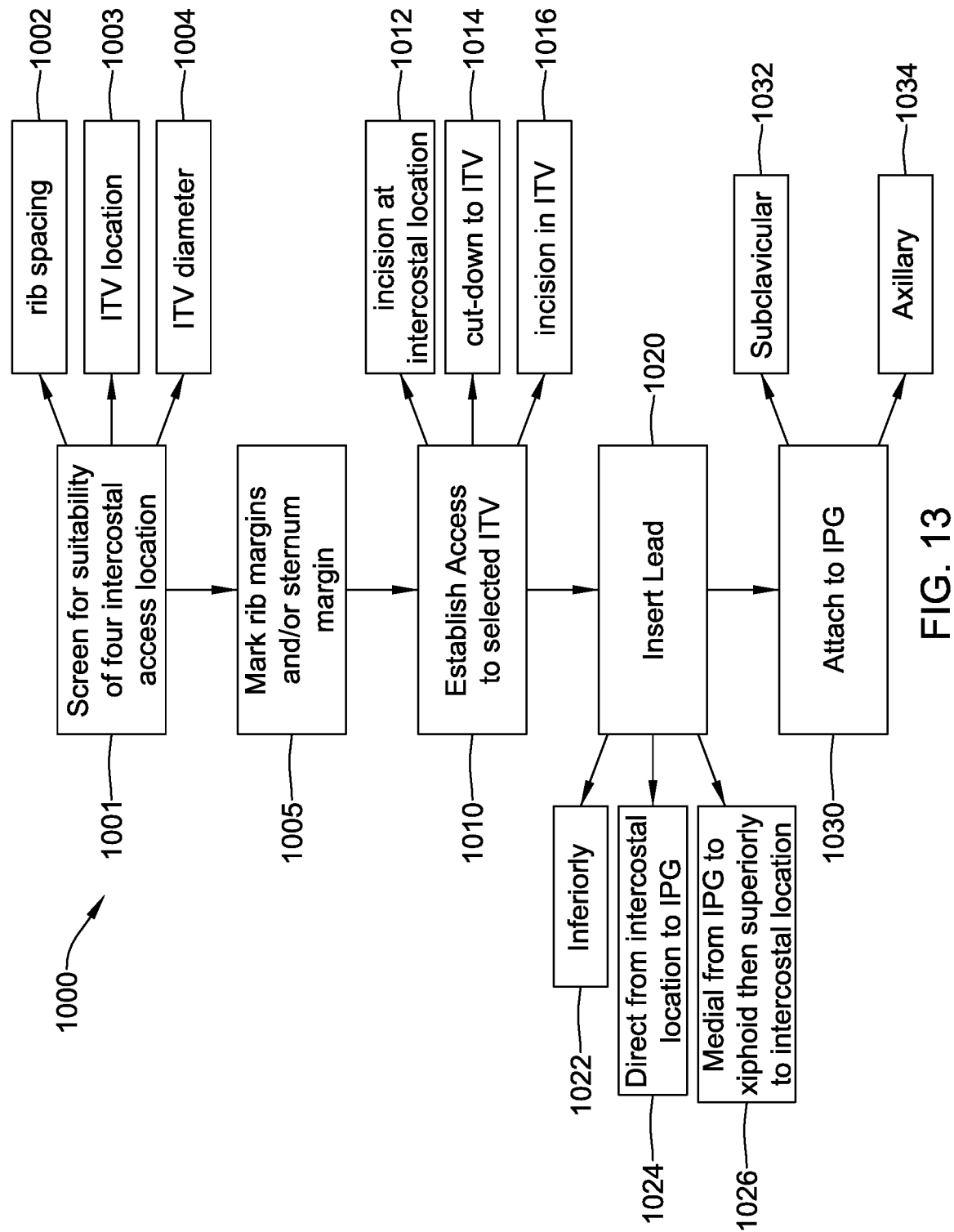
FIG. 13 is a block flow diagram for an illustrative method.

FIG. 13 is a block flow diagram for an illustrative method of implanting a lead for a cardiac rhythm management device in a patient. As shown at 1000, the method comprises screening for suitability of several intercostal access locations 1001, marking rib margins and/or sternum margin 1005, establishing access to the selected ITV 1010, inserting a lead in the ITV 1020, and attaching an implantable pulse generator (IPG) to the lead 1030. For illustrative purposes, block 1001 calls out four intercostal access locations (left and right second and third intercostal spaces); fewer, more, or different locations may be used. For example, the left and right second intercostal spaces only may be used, or the left first, second and third intercostal spaces, in other examples.

Screening for suitability of four intercostal access locations 1001 may include measuring the rib spacing 1002, measuring ITV location 1003 relative to the sternum, and measuring ITV diameter 1004 for each of four possible intercostal access locations. The four possible intercostal access locations may include the second intercostal space 340 and third intercostal space 335 over the left ITV 324, and the second intercostal space 345 and third intercostal space 342 over the right ITV 326. If at least one of the rib spacing 1002, ITV location 1003, or ITV diameter 1004 at a selected intercostal location meets the predetermined parameter for its associated screening criteria, then the rib margins and/or sternum margin are marked 1005 on the patient's skin to provide a guide for accessing the ITV.

Access to the selected ITV 1010 may include making a horizontal incision 1012 at the selected intercostal location, over the ITV, such as between ribs 2 and 3 (second intercostal location) or 3 and 4 (third intercostal location). Next, a cut-down procedure may be performed to dissect tissue and reach the ITV 1014. An incision into the ITV 1016 may then be made to complete the access into the ITV.

Once the ITV has been accessed, inserting a lead 1020 may include insertion of the lead inferiorly 1022, that is, starting at a superior location from the incision 330 in the second or third intercostal space, and advancing the lead into the ITV in an inferior direction, as shown in FIGS. 5-11. The right ITV, left ITV, or both ITV vessels may be used. The lead may travel directly from the intercostal location to the IPG 1024, as shown in FIGS. 5-8. Alternatively, the lead may extend medially from the IPG to a xiphoid incision and then extend superiorly to the intercostal location 1026, as shown in FIGS. 9-10.

Next the lead is attached to the IPG 1030. Attaching to an IPG may include attaching to a canister located in an axillary position 1034, as shown in FIGS. 5-10. The axillary position 1034 is generally used with the S-ICD System. In another example, attaching to an IPG may include attaching to a canister located in the subclavicular location 1032, as shown in FIG. 11, which is historically a common place to put an implanted canister for a transvenous defibrillator or pacemaker. Attachment may be directly to the IPG or to a splitter, yoke, or lead extension, if desired.

Other positions may be used for the canister, such as, for example, looping the canister around to the posterior ribcage of the patient. It should also be noted that concomitant systems, such as a leadless cardiac pacemaker (LCP) or subcutaneous implantable cardioverter-defibrillator (SICD) may be placed as well, and that additional leads including additional subcutaneous, epicardial, transvenous, mediastinal/substernal, and/or intracardiac leads and electrodes may be included.

In various examples, either or both of the left or right ITV may be used for any of atrial pacing, ATP, and/or bradycardia pacing. For some patients, the right ITV may be more suited to atrial pacing as needed, though this may vary with anatomy and some systems will be capable of atrial pacing from the left ITV. Either ITV may be used as well for sensing atrial and/or ventricular activity. For many patients the right ITV may be preferable for P-wave sensing, though depending on anatomy, signal strength and system capability the left ITV may be used as well. It should be noted that statement regarding right and left ITV usage for various functions may not apply to patient with unusual physiological makeups, such as those patients having a more right sided heart. For example, a patient having hypertrophic cardiomyopathy may have the right ventricle more in contact with the left ITV than in other patients, adjusting the capability for chamber specific therapy by making the left ITV less "chamber-specific" to the left side of the heart than might otherwise be the case.

Pacing therapy may be delivered between two electrodes on one lead in a single ITV. Additionally or alternatively, pacing therapy may be delivered between electrodes on a first lead disposed in one of the left or right ITV, and a second lead disposed in the other ITV. Additionally or alternatively, pacing therapy may be delivered between an electrode in an ITV and an electrode disposed on a system housing/canister or on another lead disposed outside of the ITV such as subcutaneously, mediastinally, epicardially, in another blood vessel, or within the heart of a patient.

Chamber specific pacing may be possible as well. For example, in some patients the right ITV may be used to provide pacing therapy to the atria and/or right ventricle and the left ITV may be used to provide pacing therapy to the left ventricle. Again such usage may vary with patient anatomy. Chamber specific pacing may be delivered by using two electrodes in a single ITV and/or by steering therapy output to a particular chamber by selection of an electrode on one lead in an ITV and an electrode on a second lead, in the ITV and/or elsewhere such as on a housing or canister, subcutaneously, mediastinally, epicardially, in another blood vessel, or in the heart, for example. Such steering may be performed using a directional lead or a lead having a larger number of electrodes such as 8 or 16 and, if desired, by using a current steering technique to designate select electrodes and electrode combinations to be anodes or cathodes in a current controlled therapy output using techniques such as in U.S. Pat. No. 6,909,917, the disclosure of which is incorporated herein by reference.

Other vessels and implanted lead locations may also be used (such as having a lead in the azygos vein, an intracardiac lead, a subcutaneous lead) or additional devices such as a separately implanted leadless cardiac pacemaker may be included as well. In a further example, one or more of the transverse veins that flow into the ITV may be used for placement of an electrode or lead. For example, upon accessing an ITV, a physician may further access and emplace a lead or electrode into one of the anterior intercostal veins which run along the intercostal spaces of the anterior chest.

As used herein, a coil electrode may be a helically wound element, filament, or strand. The filament forming the coil may have a generally round or a generally flat (e.g. rectangular) cross-sectional shape, as desired. However, other cross-sectional shapes may be used. The coil electrode may have a closed pitch, or in other words, adjacent windings may contact one another. Alternatively, the coil electrode may have an open pitch such that adjacent windings are spaced a distance from one another. The pitch may be uniform or varied along a length of the coil electrode. A varied pitch may be gradual tapered changes in pitch or abrupt or step-wise changes in pitch.

A coil electrode may have a length that is generally larger than its width. Round, oval or flattened coil electrodes may be used. Coil electrodes may have a length in the range of one to ten centimeters. In an example, a coil having a six or eight centimeter length may be used. In another example, a lead may have two four centimeter coils. Coils and leads may be in the range of four to ten French (Fr), or larger or smaller, in outer profile.

Coils and leads may be coated. For example, a thin permeable membrane may be positioned over a shock coil or other electrode and/or other portions of the lead to inhibit or to promote tissue ingrowth. Coatings, such as, but not limited to expanded polytetrafluoroethylene (ePTFE) may also be applied to the coil and/or lead to facilitate extraction and/or to reduce tissue ingrowth. In some embodiments, one or more of the electrodes, whether coils, rings, or segmented electrodes, include a high capacitive coating such as, but not limited to iridium oxide (IrOx), titanium nitride (TiN), or other "fractal" coatings which may be used, for example, to improve electrical performance. Steroidal and antimicrobial coatings may be provided as well.

The various components of the devices/systems disclosed herein may include a metal, metal alloy, polymer, a metal-polymer composite, ceramics, combinations thereof, and the like, or other suitable material. Some examples of suitable metals and metal alloys include stainless steel, such as 304V, 304L, and 316LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R30035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R30003 such as ELGILOY®, PHYNOX®, and the like); platinum enriched stainless steel; titanium; combinations thereof; and the like; or any other suitable material.

Some examples of suitable polymers for use in the leads discussed above may include polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyetherester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), Marlex high-density polyethylene, Marlex low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS A), polycarbonates, ionomers, biocompatible polymers, other suitable materials, or mixtures, combinations, copolymers thereof, polymer/metal composites, and the like.

In at least some embodiments, portions or all of the accessory devices and their related components may be doped with, made of, or otherwise include a radiopaque material. Radiopaque materials are understood to be materials capable of producing a relatively bright image on a fluoroscopy screen or another imaging technique during a medical procedure. This relatively bright image aids the user of the accessory devices and their related components in determining its location. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the accessory devices and their related components to achieve the same result.

Any guidewire, introducer sheath, and/or guide catheter design suitable for medical interventions may be used for accessing the venous structures discussed herein.

The implantable systems shown above may include an implantable pulse generator (IPG) adapted for use in a cardiac therapy system. The IPG may include a hermetically sealed canister that houses the operational circuitry of the system. The operational circuitry may include various elements such as a battery, and one or more of low-power and high-power circuitry. Low-power circuitry may be used for sensing cardiac signals including filtering, amplifying and digitizing sensed data. Low-power circuitry may also be used for certain cardiac therapy outputs such as pacing output, as well as an annunciator, such as a beeper or buzzer, telemetry circuitry for RF, conducted or inductive communication (or, alternatively, infrared, sonic and/or cellular) for use with a non-implanted programmer or communicator. The operational circuitry may also comprise memory and logic circuitry that will typically couple with one another via a control module which may include a controller or processor. High power circuitry such as high power capacitors, a charger, and an output circuit such as an H-bridge having high power switches may also be provided for delivering, for example, defibrillation therapy. Other circuitry and actuators may be included such as an accelerometer or thermistor to detected changes in patient position or temperature for various purposes, output actuators for delivering a therapeutic substance such as a drug, insulin or insulin replacement, for example.

Some illustrative examples for hardware, leads and the like for implantable defibrillators may be found in commercially available systems such as the Boston Scientific Teligen™ ICD and Emblem S-ICD™ System, Medtronic Concerto™ and Virtuoso™ systems, and St. Jude Medical Promote™ RF and Current™ RF systems, as well as the leads provided for use with such systems.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of implanting a lead for a cardiac rhythm management device in a patient, the method comprising:
    screening the patient for at least one screening criteria including rib spacing, internal thoracic vein (ITV) location, and ITV diameter at one or more of the right or left second or third intercostal spaces, wherein screening includes at least measuring a diameter of the ITV;
    determining the patient meets at least a predetermined parameter for the screening criteria of the measured ITV diameter, wherein the predetermined parameter is a measurement of the patient's ITV diameter of at least 2 mm;
    marking at least one of rib margin or sternum margin on skin of the patient at the right or left second or third intercostal spaces to identify an ITV access location;
    making at least one incision at the ITV access location and dissecting to the ITV;
    inserting a micropuncture wire into the ITV;
    swapping the micropuncture wire for a guidewire having a diameter greater than a diameter of the micropuncture wire, and inserting a sheath into the ITV;
    forming a tunnel by subcutaneously or submuscularly tunneling between a pulse generator pocket location and the ITV access location;
    passing a first end of a lead into the tunnel and a second end of the lead into the sheath;
    removing the sheath to leave at least the second end of the lead in the ITV; and securing the first end of the lead to a pulse generator disposed within the pulse generator pocket.

2. The method of claim 1, wherein the measurement of at least one of the rib spacing, ITV location, and ITV diameter is determined using an ultrasound transducer.

3. The method of claim 1, wherein the ITV access location is the right or left second intercostal space.

4. The method of claim 1, wherein the ITV access location is the right or left third intercostal space.

5. The method of claim 1, wherein the ITV access location is the right second or third intercostal space.

6. The method of claim 1, wherein the ITV access location is the left second or third intercostal space.

7. The method of claim 1, wherein the screening further includes measuring the distance between a sternal margin and the ITV, and the predetermined parameter for ITV location is 1 cm to 2 cm from the left or right sternal margin.

8. The method of claim 1, wherein the screening further includes measuring the patient's rib spacing, and the predetermined parameter for rib spacing is at least 2 cm.

9. The method of claim 1, wherein screening includes measuring each of the patient's rib spacing, the ITV location, and the ITV diameter, wherein determining includes determining the patient meets all of the the predetermined parameters including having a rib spacing of at least 2 cm and having an ITV location that is between 1 cm and 3 cm from the sternal margin.

10. The method of claim 1, wherein the tunnel is formed by tunneling from the pulse generator pocket location to the ITV access location.

11. The method of claim 1, wherein the tunnel is formed by tunneling from the ITV access location to the pulse generator pocket location.

12. The method of claim 1, wherein screening includes measuring each of the patient's rib spacing, ITV location, and diameter of the ITV, wherein measuring the patient's rib spacing, ITV location, and diameter of the ITV are performed at a predetermined position, the predetermined position being one of the right or left second or third intercostal spaces.

13. The method of claim 12, wherein at least one of the rib spacing, ITV location, and ITV diameter measurements are performed using an ultrasound transducer, x-ray, or fluoroscopy.

14. The method of claim 12, wherein the predetermined position is the right or left second intercostal space.

15. The method of claim 12, wherein the predetermined position is the right or left third intercostal space.

16. The method of claim 12, wherein the predetermined parameter for ITV location is at least 1 cm from the left or right sternal margin.

17. The method of claim 12, wherein the predetermined parameter for rib spacing is at least 2 cm.

* * * * *